Aug. 10, 1937.       F. W. UTLEY       2,089,452
FISHING POLE SUPPORT
Filed Sept. 9, 1935
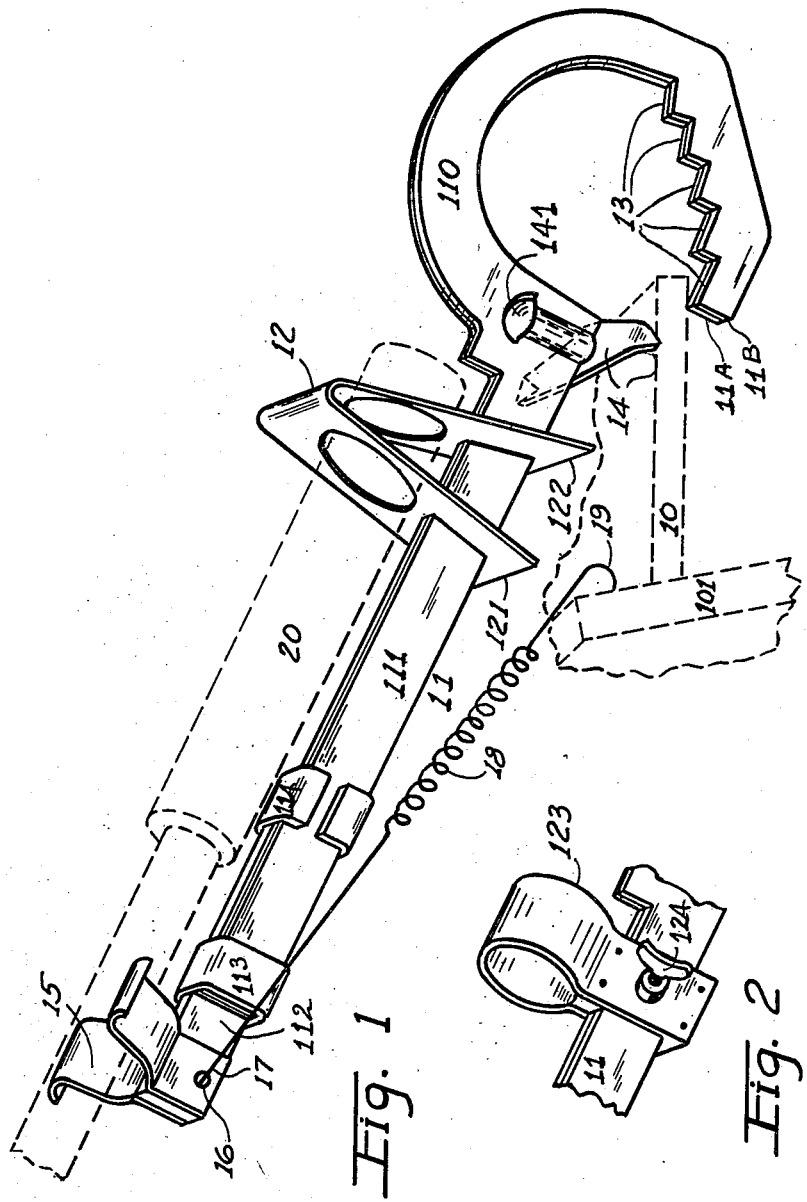
Inventor
Francis W. Utley
By John L. Milton
Attorney Patented Aug. 10, 1937

2,089,452

UNITED STATES PATENT OFFICE 2,089,452

FISHING POLE SUPPORT

Francis W. Utley, Louisville, Ky.

Application September 9, 1935, Serial No. 39,739

3 Claims. (Cl. 248—42)

The present invention relates to structure for receiving and holding a fishing pole and which in turn can be removably attached and/or secured to a support such as a boat seat or other objects.

The principal object is to provide facile means for holding a fishing pole independently of human effort and at the same time leaving the pole available for instant detachment. Another object is to provide a fishing pole-holder that can be instantly secured as a whole to various supporting objects without manipulation of parts. A further object resides in producing the device in durable simple form at a low cost.

Other objects relating to details of construction and manufacture, will appear from the description to follow covering certain embodiments of the application I have illustrated in the accompanying drawing, in which Figure 1 is a perspective view of the complete device shown in position for use as mounted on a portion of an indicated boat seat.

Fig. 2 is a modification of the pole socket slide 12 as shown in Fig. 1.

The complete device shown in Fig. 1, is mounted on a section of a seat of a boat represented by dotted lines and indicated by numeral 10. Numerals 11 and 110 indicate a main body, which will be referred to as the frame or spine and as having two major members, the straight part being referred to as the arm 11 and the C configuration as a clamp or claw, which is designated by numeral 110. The latter is provided with stepped surfaces 13, one of which is shown engaged with the lower surfaces of seat 10, while the top surface is utilized for engagement with foot or fulcrum 14, which is shown attached to the spine at or about the juncture of arm 11 and claw 110. It is, of course, obvious that this foot 14 could be made rigid or formed simultaneously with the main frame. The swiveling feature is primarily for balancing the pole holder when lodged on the seat at some angle other than at 90 degrees in terms of the near or front surface of the seat. By rotating the foot to a linear position in terms of the spine, a smaller carton can be used for shipping, whereas a rigid fulcrum of the same type would require a larger container. The arm 11 is shown as being made in two sections, 111 and 112 and held in slidable engagement by extensions 113 and 114, each of which overlaps and embraces its companion member. It must be understood that while this is a preferred form, it is entirely practicable to fabricate the arm in a single solid member, which incidently is the form which has been employed for the first production. The outer end of 11 (section 112) is provided with a forked structure 15 for receiving the fishing pole or the handle thereof. While 15 has been shown as fixed, it must be understood that, through a modification, it is susceptible of adjustment either horizontally or vertically without involving a fundamental change. At this same outer end of arm 11, an aperture 16 is located in which is placed the hook 17 of spring 18. The other end of the spring terminates in hook 19, which is shown attached to an upright 101, which is to represent another part of the boat or other support. The purpose of this arrangement is to provide auxiliary means for securing the pole holder to the boat as when used for trowling. The arm is preferably formed from two identical stampings and then spot welded as indicated in the drawing. During the fabricating period half bearings are formed in each piece 11A, 11B, which will register when the arm is welded and thereby form a bearing for rivet 141, or again these parts can be readily formed so as to rigidly secure a foot or an integral fulcrum from pieces 11A, 11B.

The socket 12 is of spring material and is provided with two shanks 121, 122, each of which is slotted for sliding on arm 11 when the shanks are squeezed and when released to grip said arm and remain fixed.

In operation the socket 12 is located on arm 11 to receive the handle 20 of a fishing pole and held either loosely or attached as desired, then the holder is rotated to the desired angle of elevation and notch 13 of the claw that corresponds to this location is selected and engaged with the seat support 10. It is therefore obvious that the pole can be used with or without the holder. The spring 18 is provided to be used when the fisherman elects to further secure the holder to the support.

In Fig. 2, the pole socket 123 is slidable on arm 11 and can be secured by thumb screw 124.

Modifications, alterations and eliminations can be indulged without departing from the spirit of the invention, therefore I desire to be limited only by the appended claims.

I claim:

1. In combination with a horizontal support and a staff supporting arm, said arm having a foot and an integral C-shaped extension hooked over the support, with the foot resting on the support and the extension extending downwardly over the edge of the support and inwardly beneath the support, whereby when the load is applied to the arm it will be canted and cause the foot and extension to grip the upper and lower sides of the support, respectively.

2. In combination with a horizontal support and a staff supporting arm, said arm having a foot and an integral C-shaped extension having a plurality of inwardly projecting steps, said extension being hooked over the support, with the foot resting on the support and the extension extending downwardly over the edge of the support and inwardly beneath the support, whereby when the load is applied to the arm it will be canted and cause the foot and one of the steps of the extension to grip the upper and lower sides of the support, respectively.

3. In combination with a horizontal support and a staff supporting arm, said arm having a swiveled bifurcated foot and an integral C-shaped extension equipped with a plurality of inwardly projecting steps, said extension being hooked over the support, with the contacting teat of the foot resting on the support and the extension extending downwardly over the edge of the support and inwardly beneath the support, whereby when the load is applied to the arm it will be canted and cause the foot and one of the steps of the extension to grip the upper and lower sides of the support, respectively, with the points of contact falling in various planes which are parallel to said arm.

FRANCIS W. UTLEY.